(12) United States Patent
    Tione

(10) Patent No.: US 12,377,706 B2
(45) Date of Patent: Aug. 5, 2025

(54) SYSTEM FOR THE GENERATION OF COMPRESSED AIR AND FOR AIR CONDITIONING, FOR A RAILWAY VEHICLE

(71) Applicant: FAIVELEY TRANSPORT ITALIA S.P.A., Turin (IT)

(72) Inventor: Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 357 days.

(21) Appl. No.: 17/753,906

(22) PCT Filed: Sep. 16, 2020

(86) PCT No.: PCT/IB2020/058598
    § 371 (c)(1),
    (2) Date: Mar. 17, 2022

(87) PCT Pub. No.: WO2021/053524
    PCT Pub. Date: Mar. 25, 2021

(65) Prior Publication Data
    US 2022/0355642 A1    Nov. 10, 2022

(30) Foreign Application Priority Data
    Sep. 17, 2019   (IT) .................. 102019000016490

(51) Int. Cl.
    *B60H 1/00*     (2006.01)
    *B60H 1/32*     (2006.01)
    (Continued)

(52) U.S. Cl.
    CPC ....... *B60H 1/00371* (2013.01); *B60H 1/3223* (2013.01); *B60T 17/02* (2013.01); *B61D 27/0018* (2013.01)

(58) Field of Classification Search
    CPC .............. B60H 1/00371; B60H 1/3223; B60T 17/02; B60T 17/228; B60T 13/26; B60T 17/004;
    (Continued)

(56) References Cited

U.S. PATENT DOCUMENTS 9,296,389 B2    3/2016  Bernhardt
    9,577,008 B2    2/2017  Miyake et al.
    (Continued)

FOREIGN PATENT DOCUMENTS

CN    103538474 A       1/2014
    CN    106143093 A  *  11/2016  ............... B60K 1/00
    (Continued)

OTHER PUBLICATIONS

CN 106143093 A Translation (Year: 2016).*
    WO 2012029086 A1 Translation (Year: 2012).*
    (Continued)

*Primary Examiner* — Jerry-Daryl Fletcher
    *Assistant Examiner* — Dario Antonio Deleon
    (74) *Attorney, Agent, or Firm* — K&L Gates LLP

(57) ABSTRACT

A system is described comprising a first compressor for generating compressed air to feed a main tank and a main brake pipe of the railway vehicle through an air drying unit and a second compressor for compressing a refrigerant gas for an air conditioning system. The system comprises a single electric motor for generating a mechanical torque to be selectively supplied to the first compressor, or to the second compressor, or simultaneously to the first and second compressors, as a function of a) a first electrical signal generated by a pressure measurement device and indicative of a pressure present in the main brake pipe, or in the main tank, and b) at least a second electrical signal coming from the air conditioning system and indicative of a temperature or pressure or humidity value, and at least a third electrical signal indicative of a temperature of an environment.

10 Claims, 7 Drawing Sheets

(51) Int. Cl.
*B60T 17/02* (2006.01)
*B61D 27/00* (2006.01)

(58) Field of Classification Search
CPC ..... B61D 27/0018; B61D 27/00; Y02T 30/00; B61H 13/00; B61H 13/20; B60Y 2200/30
See application file for complete search history.

(56) References Cited

U.S. PATENT DOCUMENTS

| | | | |
|---|---|---|---|
| 10,041,494 | B2 | 8/2018 | Mizufune et al. |
| 2011/0130427 | A1 | 6/2011 | Hamamoto |
| 2014/0033706 | A1* | 2/2014 | Favaretto ............... F02B 39/10 60/607 |
| 2016/0377075 | A1* | 12/2016 | Kipp et al. ............. F04B 35/04 137/12 |
| 2020/0094690 | A1* | 3/2020 | Sondur et al. ........ B60T 17/228 |
| 2020/0269659 | A1* | 8/2020 | Norden ................. B60H 1/143 |
| 2021/0010481 | A1* | 1/2021 | Plow et al. ........... B60T 17/004 |
| 2021/0129629 | A1* | 5/2021 | Frankerberger et al. ................... B61D 27/0018 |
| 2022/0355642 | A1 | 11/2022 | Tione |

FOREIGN PATENT DOCUMENTS

| | | | | |
|---|---|---|---|---|
| DE | 102007019126 | A1 | 10/2008 | |
| DE | 102009035398 | A1 * | 2/2011 | ............ B60K 25/00 |
| EP | 4031431 | B1 | 2/2025 | |
| JP | 2001082409 | A | 3/2001 | |
| JP | 2002089456 | A | 3/2002 | |
| JP | 2011011722 | A | 1/2011 | |
| JP | WO 2012029086 | A1 * | 3/2012 | ............ B61D 27/00 |
| JP | 2014012449 | A | 1/2014 | |
| JP | 5718557 | B2 | 5/2015 | |
| JP | 2015217756 | A | 12/2015 | |
| KR | 20180094014 | A | 8/2012 | |
| KR | 20170069377 | A | 6/2017 | |
| KR | 101958836 | B1 | 7/2019 | |
| WO | 2012029086 | A1 | 3/2012 | |

OTHER PUBLICATIONS

DE 102009035398 A1 Translation (Year: 2011).*
ISA European Patent Office, International Search Report Issued in Application No. PCT/IB2020/058598, Jan. 18, 2021, WIPO, 4 pages.
ISA European Patent Office, Written Opinion of the International Searching Authority Issued in Application No. PCT/ B2020/ 058598, Jan. 18, 2021, WIPO, 7 pages.

* cited by examiner

SYSTEM FOR THE GENERATION OF COMPRESSED AIR AND FOR AIR CONDITIONING, FOR A RAILWAY VEHICLE

CROSS REFERENCE TO RELATED APPLICATIONS

The present application is a U.S. National Phase of International Application No. PCT/IB2020/058598 entitled "SYSTEM FOR THE GENERATION OF COMPRESSED AIR AND FOR AIR CONDITIONING, FOR A RAILWAY VEHICLE," and filed on Sep. 16, 2020. International Application No. PCT/IB2020/058598 claims priority to Italian Patent Application No. 102019000016490 filed on Sep. 17, 2019. The entire contents of each of the above-listed applications are hereby incorporated by reference for all purposes.

TECHNICAL FIELD

This invention generally relates to the field of air conditioning and compressed air generation systems for railway vehicles.

PRIOR ART

The most recent trains for passenger rail transport are made up of fixed trainsets. The definition of "fixed trainset" indicates that the configuration of the vehicle is defined in the design phase, where the composition defines which vehicles will be equipped with traction drive, and which vehicles will be towed. After the construction and composition of the train, said train will be broken down into individual vehicles only in case of maintenance due to serious structural damage associated with one of the vehicles making up the train.

FIG. 1 illustrates a non-exclusive example of a fixed trainset 100 consisting of five cars 101, ..., 105.

It is state of the art that each railway vehicle making up the train 100 is equipped with a local HVAC (Heating, Ventilation, Air Conditioning) system, that is, a system for heating, ventilation and air conditioning of the passenger compartment.

It is also known that in the railway passenger transport system, the braking systems use compressed air appropriately injected into brake cylinders to generate braking force. Compressed air is generated by one or more compressors. Compressors for this purpose are available with different air flow rates. Generally two compressors 121, 124 are installed, as illustrated by way of non-exclusive example in FIG. 1. The dimensioning of the flow rate is derived from the filling speed requirements of the empty system at the daily start-up of the train, and from redundancy criteria in case of failure of at least one of the installed compressors.

It is known that the HVAC systems 111, ..., 115 are each integrated into self-contained structures, typically designed to be installed on the train roof. FIG. 3 illustrates a real 1:1 scale example of an HVAC system for regional trains.

FIG. 2 shows how inside an HVAC system, in addition to various other devices, there is a compressor 201 used for compressing the refrigerant gas, said refrigerant gas exchanged with the rest 202 of the HAVC system. The compressor 201 is mechanically connected to a motor 203 by means of a shaft 204. A mechanical joint, not shown in the figure, may be interposed between the motor 203 and the compressor 201 to compensate for misalignments of the two resulting half-shafts. An electronic unit 205 receives electrical signals 207 coming from sensors forming part of the HVAC system 202 and electrical signals 208 coming from the passenger compartments to be conditioned. The electronic unit 205 controls a power supply device 206. The power supply device 206 receives electrical energy 209 distributed on board the vehicle and powers the motor 203. Said power supply device 206 may be a simple remote control switch or a power frequency control device, to control said motor 203 with speed control criteria. A recurring power value for the motor 203 is on the scale of 10 KVA.

An HVAC system, similar in size to that illustrated in FIG. 3, usually has a weight on the scale of 500 kg.

It is known that AGTU systems 121, 124 are each integrated into self-contained structures, typically designed to be installed on the roof of the associated vehicle, or suspended under the body of the associated vehicle. FIG. 5 shows a real example in 1:1 scale of an AGTU system for passenger vehicles.

FIG. 4 shows how inside an AGTU system, in addition to various other devices, there is a compressor 401 used for compressing air. The compressed air is sent to a dryer 402 and subsequently accumulated in a main tank 403, from which it is then distributed to the users through a main brake pipe 404.

The compressor 401 is mechanically connected to a motor 405 by means of a resilient joint 406. The resilient joint 406 is used to compensate for misalignments of the two resulting half-shafts. A pressure switch 407 having a hysteresis turns on a power supply device 408 at a minimum pressure value, by way of non-exclusive example between 7 bar and 8 bar. The pressure switch 407 turns off the power supply device 408 at a maximum pressure value, by way of non-exclusive example, between 9 bar and 10 bar. The power supply device 408 may be a remote control switch, or more rarely, a power frequency control device, to control the motor 405 with speed control criteria, known as "soft start."

A typical power/flow rate ratio for the motor 405 is on the scale of 1 KVA for a flow rate of 100 L/min. For a real case such as a passenger train as illustrated in FIG. 1, for each AGTU system 121, 124 a flow rate between 800 L/min and 1200 L/min is required, i.e. each motor 405 is required to have a power between about 8 KVA and 12 KVA.

An AGTU system, of similar dimensions to that illustrated in FIG. 5, has a weight on the scale of 500 kg. The weight of the associated motor 405 is on the scale of 70 kg. The weight of the support frame for the complete AGTU may vary from 70 kg to 150 kg.

In order to reduce the sources of pollution such as lubricating oils inside the compressors, the technology known as "oil-free" is currently preferred. The "oil-free" solution further improves the so-called "Life Cycle Cost" LCC, that is the total life cycle cost of the compressor, as the "oil-free" solution eliminates the periodic maintenance cycles linked to replacing the lubricating oil.

The aforementioned air flow rates may be reached, through "oil-free" technologies, exclusively by means of piston compressors, characterized by high acoustic noise and high vibrations induced to the load-bearing structures, or to the cars of the vehicles to which they are attached.

There are known "oil-free" alternatives to piston compressors, known as "scroll" compressors, characterized by a purely rotary behavior, free from acoustic noise and harmful mechanical vibrations. However, these "scroll" compressors do not reach high flow rates, on the order of 500 l/min. Wanting to use scroll compressors, it would be necessary to insert many units with the additional costs of motors and AGTU support frames, leading to an increase in weight and the required space available for their installation.

SUMMARY OF INVENTION

An object of this invention is to provide a solution which allows the integration of AGTU systems and HVAC systems forming part of at least one railway vehicle, or more railway vehicles of the same railway train.

A further object is to provide a solution which allows the number of motors necessary for the generation of compressed air and for the air conditioning of at least one railway vehicle, or several railway vehicles of the same railway train, to be reduced.

The aforesaid and other objects and advantages are achieved, according to an aspect of the invention, by a system for the generation of compressed air and for air conditioning having the features defined in claim 1. Preferred embodiments of the invention are defined in the dependent claims, the content of which is to be understood as an integral part of this description.

BRIEF DESCRIPTION OF THE DRAWINGS

The functional and structural features of some preferred embodiments of an electronic control system for emergency and service braking according to the invention will now be described. Reference is made to the accompanying drawings, wherein.

DETAILED DESCRIPTION

Figure 1:
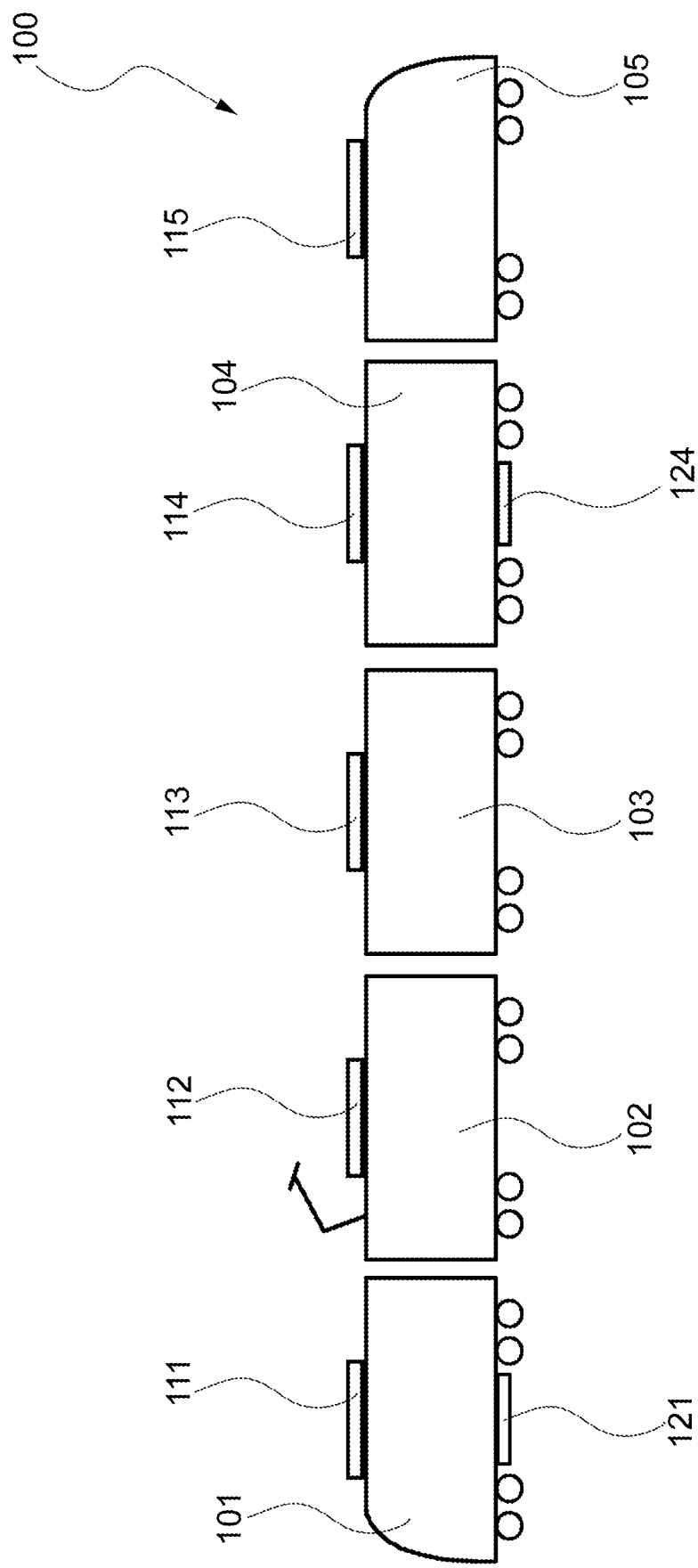
FIG. 1 illustrates a non-exclusive example of a fixed trainset constituted by five cars.
Figure 2:
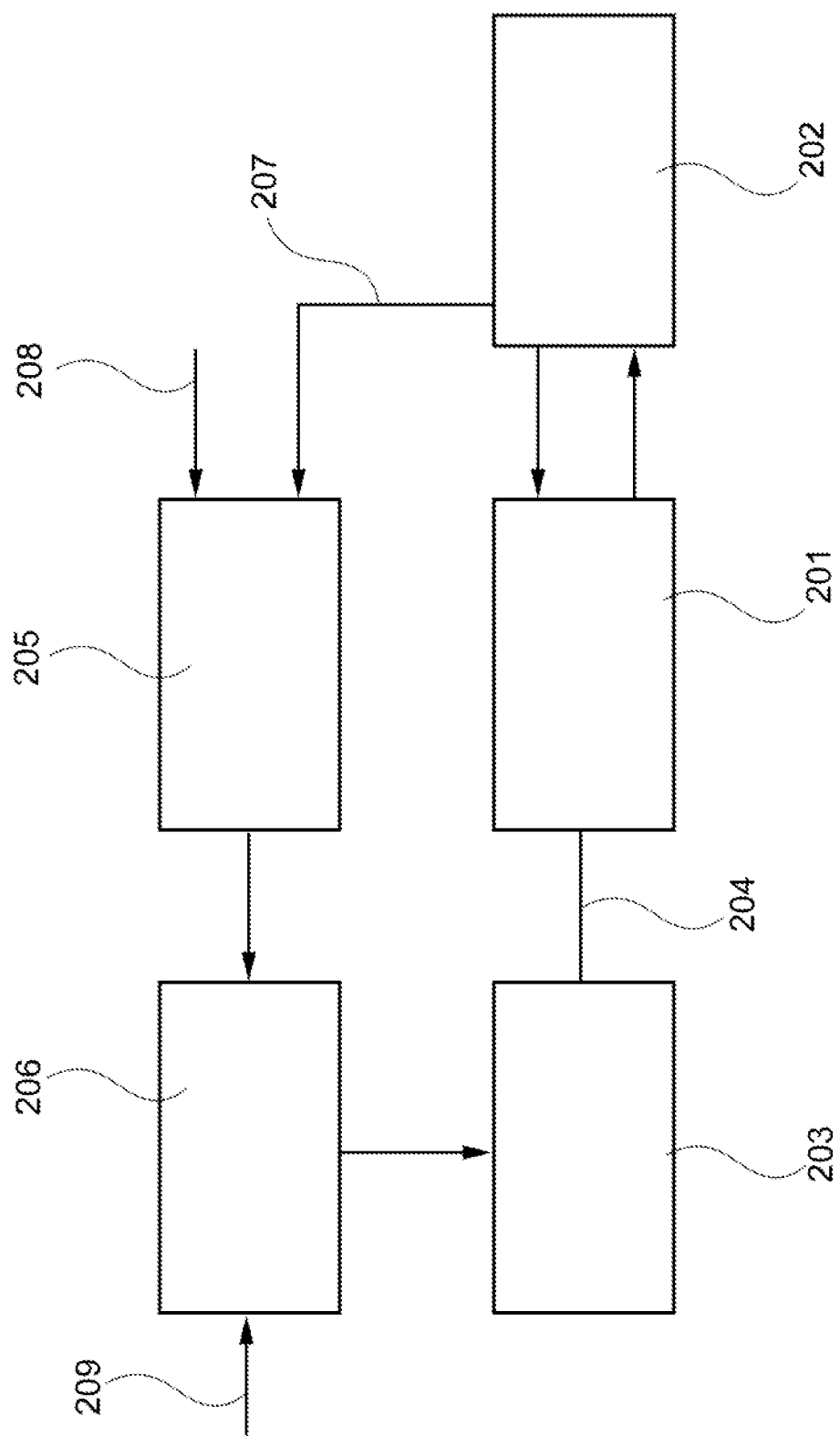
FIG. 2 illustrates the internal structure of an HVAC system.
Figure 3:
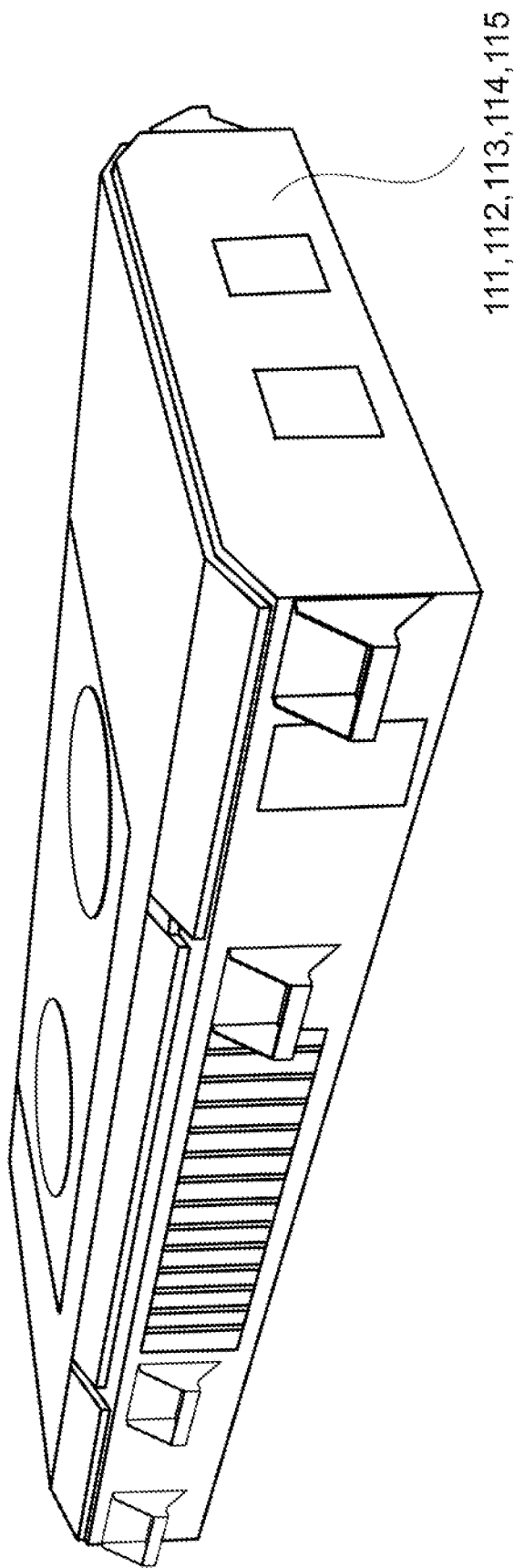
FIG. 3 illustrates a real example of an HVAC system for vehicles used for passenger transport.
Figure 4:
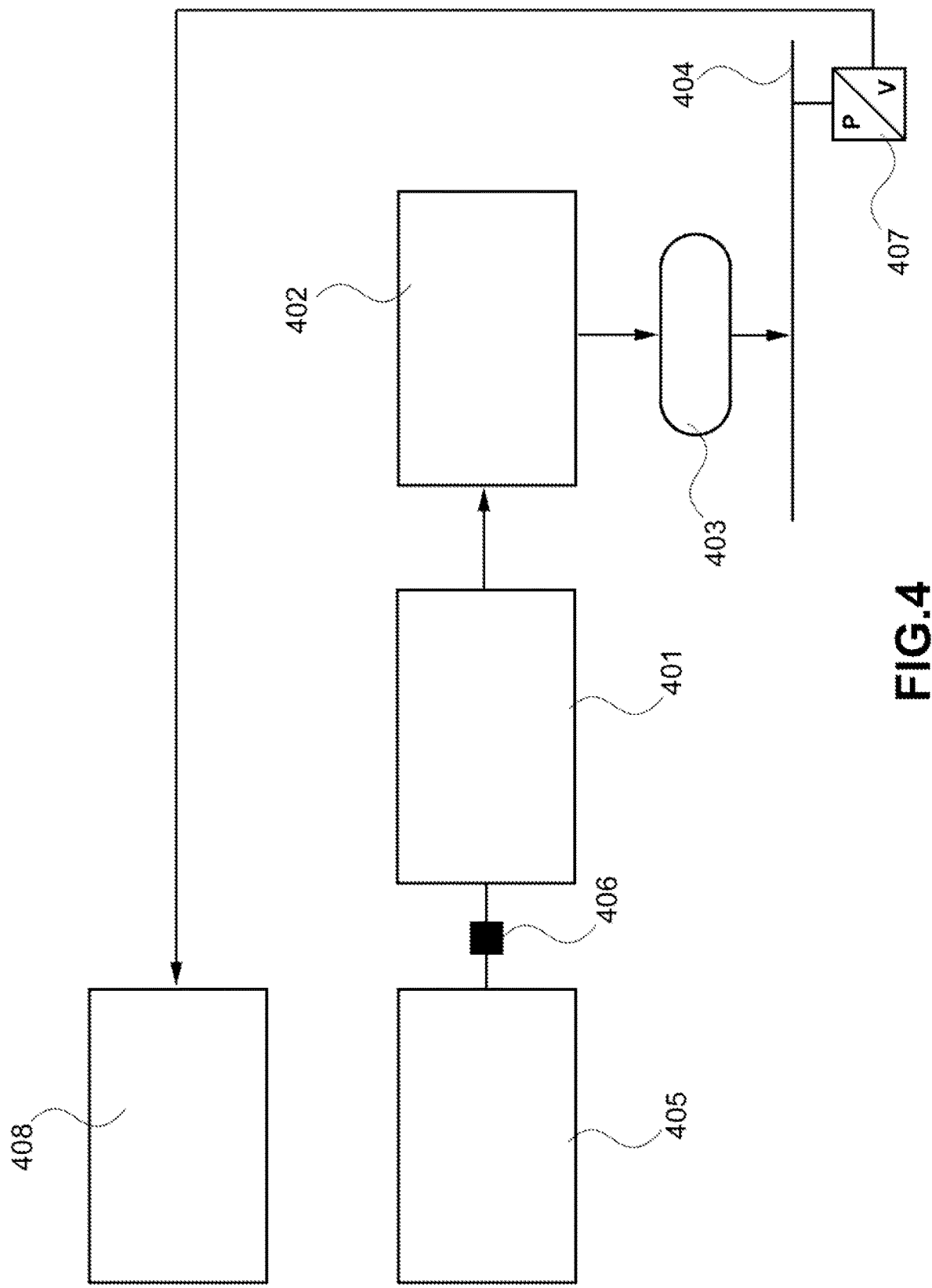
FIG. 4 illustrates the internal structure of an AGTU system.

Before describing in detail a plurality of embodiments of the invention, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

This patent relates to a solution for the integration of AGTU systems and HVAC systems forming part of the same train.

Figure 6:
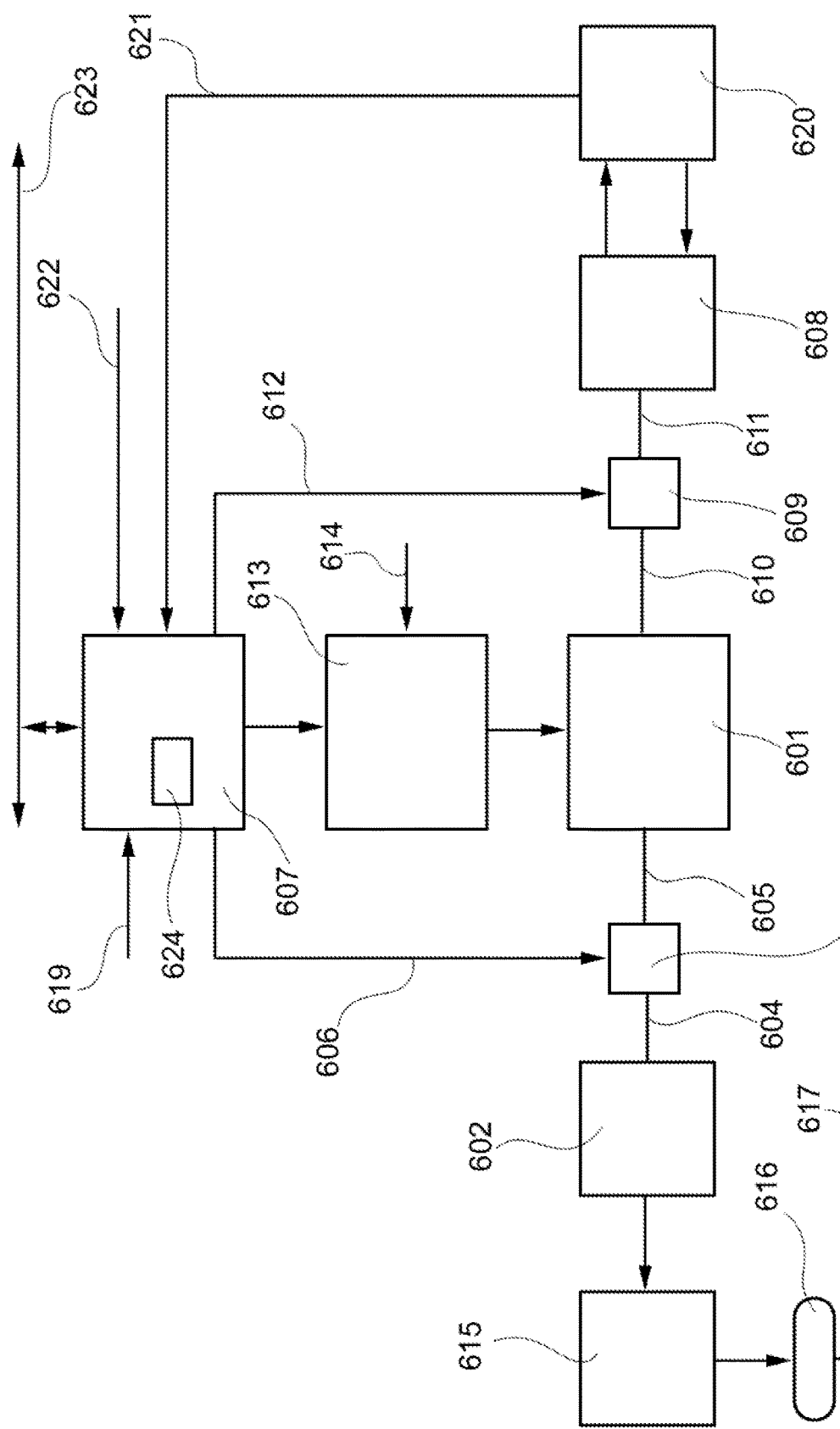
FIG. 6 illustrates a system for the generation of compressed air and for air conditioning according to the invention.

FIG. 6 illustrates a system for the generation of compressed air and for air conditioning according to the invention.

In particular, a single electric motor 601 may be selectively coupled to a first compressor 602 for compressed air by a first coupling means 603.

The first compressor 602 is arranged to compress the air taken in at atmospheric pressure. The air is sent to a dryer 615 and subsequently accumulated in a main tank 616, from which it is then distributed to various users through a main brake pipe 617. The users may, by way of non-exclusive example, be the train braking system.

The single electric motor 601 may be further selectively coupled to a second compressor 608 by a second coupling means 609.

The second compressor 608 is joined to an HVAC 111, . . . , 115 system.

The second compressor 208 is arranged to compress the refrigerant gas, which is exchanged with the rest of the HAVC system 620.

In this way, the system 600 comprises a single electric motor 601 arranged to generate a mechanical torque to be selectively supplied to the first compressor 602 and/or to the second compressor 608.

The mechanical torque will be selectively supplied to the first compressor 602 and/or to the second compressor 608 as a function of a first electrical signal 619 generated by a pressure measurement device 618 and indicative of a pressure present in the main brake pipe 617, or in the main tank 616, and of at least a second electrical signal 621 coming from the air conditioning system 620 and indicative of a temperature value or a pressure value or a humidity value, and at least a third electrical signal 622 indicative of a temperature of an environment to be conditioned of the railway vehicle.

The system may comprise an electronic control unit 607 arranged to generate a first control signal 606 for the first coupling means 603 so as to couple or uncouple the electric motor 601 and the first compressor 602, and a second control signal 612 for a second coupling means 609 so as to couple or uncouple the electric motor 601 and the second compressor 608.

The first coupling means 603 and the second coupling means 609 may be respective electromagnetic joints.

In this case, the first coupling means 603, i.e. the electromagnetic joint, couples/uncouples a first half-shaft 604 associated to the first compressor 602 and a second half-shaft 605 associated to the electric motor 601, as a function of the first electrical command 606 generated by the electronic control unit 607.

When the first coupling means 603 connects the first and second half-shafts 604, 605, the electric motor 601 transmits mechanical torque to the first compressor 602. On the other hand, when the first coupling means 603 decouples the first half-shaft 604 and the second half-shaft 605, the first compressor 602 receives no mechanical torque from the electric motor 601.

The second coupling means 609, i.e. the electromechanical joint, couples/uncouples a third half-shaft 610 and a fourth half-shaft 611 as a function of the second electrical command 612 generated by the electronic control unit 607. The third half-shaft 610 is associated to the electric motor 601 and the fourth half-shaft 611 is associated to the second compressor 608.

When the second coupling means 609 couples the second half-shaft 610 and the third half-shaft 611, the electric motor 601 transmits mechanical torque to the second compressor 608. On the other hand, when the second coupling means 609 decouples the third half-shaft 610 and the fourth half-shaft 611, the second compressor 608 receives no mechanical torque from the electric motor 601.

For example, but not exclusively, the electromechanical joint of the first coupling means 603 and the electromechanical joint of the second coupling means 609 may each be an electromagnetic clutch.

Figure 5:
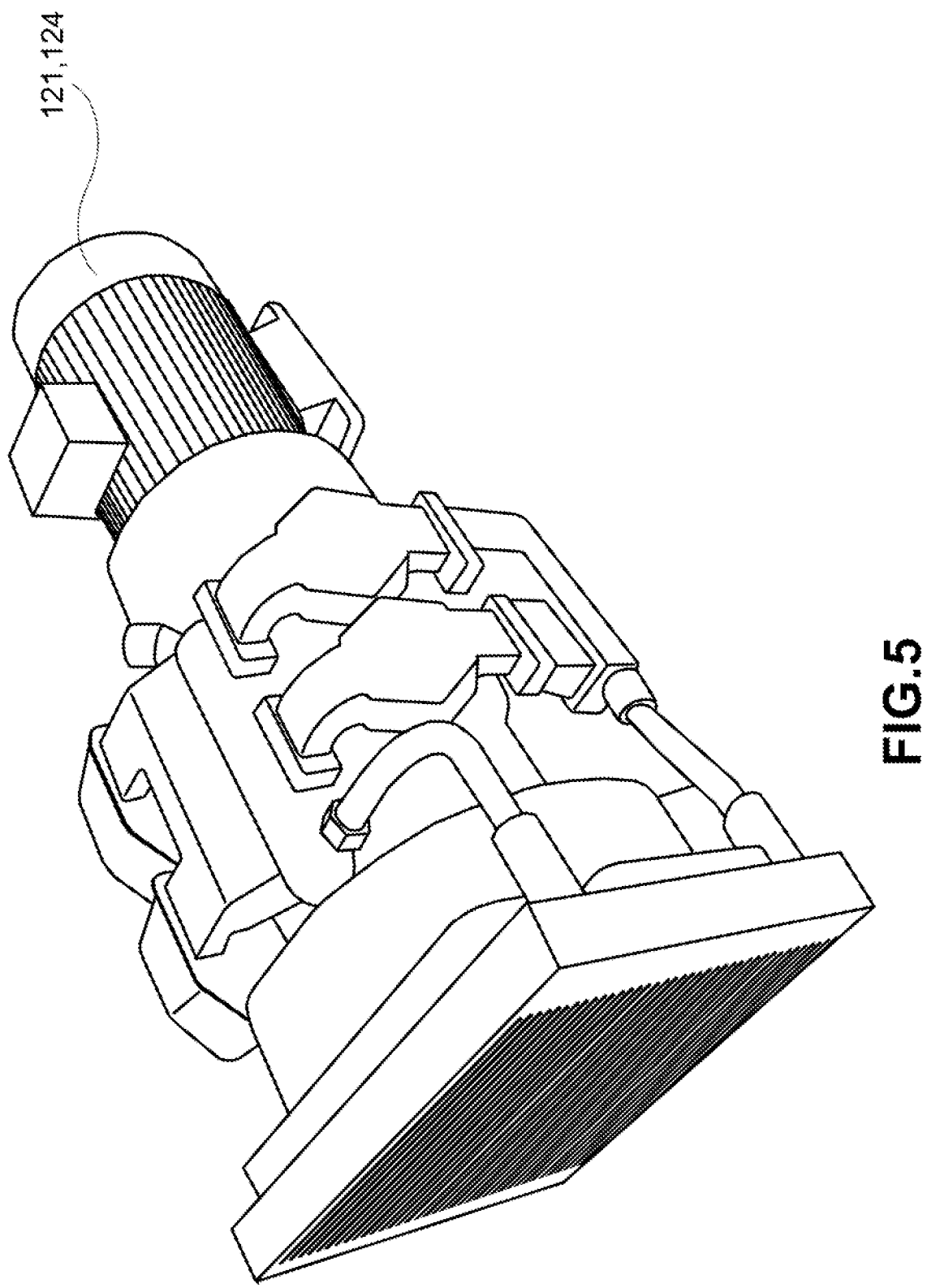
FIG. 5 illustrates an example of an AGTU system for vehicles used for passenger transport.

Still observing FIG. 5, the electronic control unit 607 receives the first electrical signal 619 generated by the pressure measurement device 618.

The pressure measurement device 618 may be, for example, but not exclusively, a pressure switch with hysteresis. In this case, the first electrical signal 619 may indicate the need to activate the first compressor 602, and therefore the need to supply the mechanical torque generated by the electric motor to the first compressor 602, when the first electrical signal 619 indicates that the pressure on the main brake pipe 617, measured by the pressure measurement device 618, reaches a minimum pressure, by way of non-exclusive example between 7 bar and 8 bar.

In another case, the pressure measurement device 618 may be, by way of non-exclusive example, a pressure sensor generating a first electrical signal 619 proportional to the pressure value measured on the main brake pipe 617. In this case, the first electrical signal 619 may indicate the need to deactivate the first compressor 602, and therefore does not indicate the need to supply the mechanical torque generated by the electric motor to the first compressor 602, when the pressure on the main brake pipe 617, measured by the pressure measurement device 618, reaches a maximum pressure, by way of non-exclusive example between 9 bar and 10 bar.

Furthermore, the electronic control unit 607 also receives the at least one second electrical signal 621 coming from the at least one sensor belonging to the HVAC system 620 and the at least one third electrical signal 622 coming from the at least one temperature sensor in a passenger compartment of the train to be conditioned. Obviously, the second electrical signals 621 may be a plurality and come from several sensors, each suitable for measuring a pressure or temperature or humidity relating to the HVAC system 620, and the third electrical signals 622 may be a plurality and come from a plurality of temperature sensors arranged in various passenger compartments to be conditioned of the railway vehicle.

The electronic control unit 607 may control a power supply device 613 arranged to receive electrical power 614 distributed on board the railway vehicle and to power the motor 601.

The power supply device 613 may be for example a simple remote control switch or a power frequency control device, also known by the technical term of "inverter," for controlling the electric motor 601 with speed control criteria.

The electronic control unit 607 may activate the power supply device 613, and consequently the electric motor 601, if the first electrical signal 619 indicates the need to activate the first compressor 602, or if at least one of either the second electrical signal 621 or the third electrical signal 622 indicates the need to activate the second compressor 608, and therefore indicates the need to supply the mechanical torque generated by the electric motor to the second compressor 608.

In the event of the simultaneous absence of a request for activation of the respective compressors 602, 608 by the first electrical signal 619, and the second electrical signal 621 and the third electrical signal 622, the electronic control unit 607 deactivates the power supply device 613, switching off the electric motor 601.

Summarizing what has been set out above, the electronic control unit 607 continuously analyzes the first electrical signal 619 and the second electrical signal 621 and the third electrical signal 622, and decides when to activate the power supply device 613, and consequently the electric motor 601, and which one of either the first coupling means 603 or the second coupling means 609 to activate to supply suitable mechanical torque, generated by the electric motor, to the first compressor 602 and/or to the second compressor 608, respectively.

In one possible embodiment, the electric motor 601 is scaled to be able to supply a mechanical torque equivalent to the sum of the peak mechanical torques of the first and second compressors 602, 608, so that they may be activated simultaneously.

In this embodiment, the electronic control unit 607 activates the first coupling means 603 if the first electrical signal 619 indicates the need to activate the first compressor 602, and activates the second coupling means 609 if at least one of either the second electrical signal 621 or the third electrical signal 622 indicates the need to activate the second compressor 608. In case of the simultaneous presence of an activation request by the first electrical signal 619 and the second electrical signal 621 or third electrical signal 622, of the respective compressors 602, 608, the electronic control unit 607 simultaneously activates both the first coupling means 603 and the second coupling means 609 so as to connect the electric motor 601 both to the first compressor 602 and to the second compressor 608.

The electronic control unit 607 will deactivate the first coupling means 603 when the first electrical signal 619 indicates that the maximum pressure has been reached at the main tank 616, i.e. it does not indicate the need to supply the mechanical torque generated by the electric motor to the first compressor 602, or will deactivate the second coupling means 609 if at least one of either the second electrical signal 621 or the third electrical signal 622 indicates that the compression of the refrigerant gas is not necessary, i.e. it does not indicate the need to supply the mechanical torque generated by the electric motor to the second compressor 608.

In a further possible embodiment, the electric motor 601 is scaled to provide the greater of either the peak mechanical torque of the first compressor 602 or the peak mechanical torque of the second compressor 608.

In this further embodiment, since the electric motor 601 may supply only the greater of the mechanical torques characteristic of the two compressors 602, 608, in the event of simultaneous requests to activate the electric motor 601 from the first electrical signal 619 and at least one of either the second electrical signal 621 or the third electrical signal 622, the electronic control unit 607 alternately activates the first coupling means 603 and the second coupling means 609, according to pre-loaded strategies, for example in a non-volatile memory 624 in the form of executable code or operating parameters, so as to alternately connect the electric motor 601 to the first compressor 602 and to the second compressor 608.

For example, but not exclusively, a first strategy consists in giving absolute priority to the mechanical torque request coming from the first electrical signal 619 for the first compressor 602, since it is normally linked to the pressure request from the braking system.

In the presence of a mechanical torque request from the first electrical signal 619, the electronic control unit 607 carries out the following steps:
  activate the power supply device 613, if it is not already activated;
  deactivate the second coupling means 609, if this had already been activated due to an ongoing request from at least one of either the second electrical signal 621 or the third electrical signal 622;
  activate the first coupling means 603, keeping it activated until the pressure at the main tank 616 has reached the predetermined maximum value.

When the pressure at the main tank 616 has reached the predetermined maximum value, the electronic control unit 607 performs the following steps:
  deactivate the first coupling means 603;
  activate the second coupling means 609, if there is an ongoing request from at least one of either the second electrical signal 621 or the third electrical signal 622;
  deactivate or keep deactivated the second mechanical coupling means 609 and deactivate the power supply device 613 if a request from the second electrical signal 621 and the third electrical signal 622 fails or is not present.

If, during the phase wherein the second coupling means 609 is activated, a request occurs again from the first electrical signal 619, the cycle starts again.

By way of non-exclusive example, a second strategy consists in giving temporary priority to the activation request coming from the first electrical signal 619, as it is normally linked to the pressure request from the braking system. This second strategy requires the pressure measurement device 618 to be comprised of a linear pressure transducer capable of supplying, as a first electrical signal 619, a continuous pressure value signal.

In the presence of a mechanical torque request from the first electrical signal 619, the electronic control unit 607 carries out the following steps:
  activate the power supply device 613, if it is not already activated;
  deactivate the second coupling means 609, if this is already activated due to an ongoing request by at least one of either the second electrical signal 621 or the third electrical signal 622;
  activate the first coupling means 603, keeping it activated until the pressure at the main tank 616 has reached a first intermediate pressure value comprised between the minimum value and the predetermined maximum value, said first pressure value being sufficient to ensure, by way of non-exclusive example, at least one emergency braking;
  having reached said first intermediate value, deactivate the first coupling means 603, and activate the second coupling means 609;
  when the second electrical signal 621 and the third electrical signal 622 indicate that the request for mechanical torque for the second compressor 608 has ended, deactivate the second coupling means 609 and reactivate the first coupling means 603;
  when the first electrical signal 619 indicates that the predetermined maximum pressure value has been reached, deactivate the first coupling means 603 and deactivate the power supply device 613.

During the described sequence, any return of the first electrical signal 619 to the value indicating a minimum pressure at the main tank 616 reactivates the sequence from the beginning.

The first and second compressors 602 and 608 may be volumetric compressors. It is well known that the mechanical torque required by a volumetric compressor may be considered proportional to the pressure at its output, unless torque contributions are necessary to overcome the friction of said compressor.

Based on this definition, it may be defined that the torque required by the first compressor 602 when the pressure at the main tank 616 is at its predetermined minimum value is less than the torque required by the first compressor 602 when the pressure at the main tank 616 has reached the predetermined maximum value. A similar consideration may be made for the second compressor 608. It is therefore possible that, if both the first and second compressors 602, 608 are at their respective minimum operating pressures, the sum of the mechanical torques necessary to move said compressors is lower than the maximum torque that may be supplied by the electric motor 601.

It is known that an inverter device which is part of or constituting the power supply device 613 is capable of controlling the currents supplied to the electric motor 601, of knowing the instantaneous value of said currents, and of giving continuous information of said instantaneous value of said currents to the electronic control unit 607.

By way of non-exclusive example, a third strategy in the presence of a simultaneous request to supply mechanical torque to the respective compressors 602, 608 from the first electrical signal 619 and at least one of either the second electrical signal 621 or the third electrical signal 622, if the power supply device 613 comprises or is constituted of an inverter, provides for the electronic control unit 607 to activate simultaneously the first coupling means 603 and the second coupling means 609, so as to connect the electric motor 601 both to the first compressor 602 and to the second compressor 608, as long as the current delivered by the inverter 613 does not reach the maximum value that may be supplied by said inverter 613.

When the maximum deliverable current value is reached by the inverter as a consequence of the progressive increase of the pressures downstream of the first and second compressors 602, 608, the electronic control unit 607 may subsequently adopt the first strategy or the second strategy described above.

FIG. 1 illustrates a non-exclusive example of a fixed trainset 100 constituted by five cars 101, . . . , 105, where each car is equipped with a local HVAC system 111, . . . , 115. The train 100 is further equipped with two local AGTU systems 121, 124. If the solution of this invention were adopted, the train 100 would take the form 700 shown in FIG. 7, where each car 701, . . . , 705 is provided with its own system for the generation of compressed air and for air conditioning 711, . . . , 715.

In this case, the air flow supplied by the two compressors integrated in the AGTU systems 121, 124 is divided between the various systems for the generation of compressed air and for air conditioning 711, . . . , 715.

Figure 7:
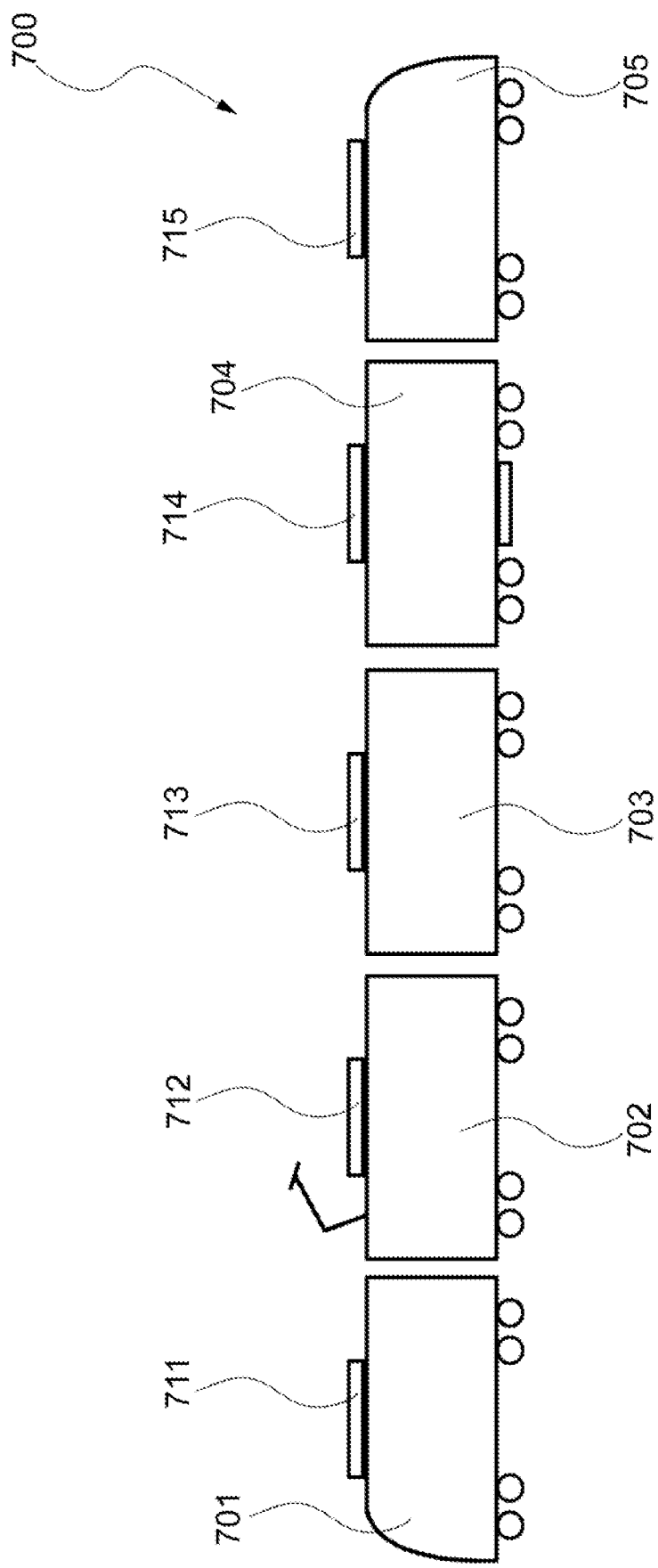
FIG. 7 illustrates a non-exclusive example of a fixed trainset constituted by five cars, which adopts the solution illustrated in FIG. 5.

This new configuration, illustrated in FIG. 7, offers the benefit of eliminating the AGTU systems 121, 124, with a consequent reduction in the weight of the train 700 and an increase in the space available for the installation of other systems otherwise installed in the car.

Furthermore, the distribution from a limited number of AGTU systems 121, 124 to a greater number of systems for the generation of compressed air and for air conditioning 711, . . . , 715 allows the reduction of the flow rate of the compressors integrated in the systems for the generation of compressed air and for air conditioning 711, . . . , 715, by way of non-exclusive example in the case of FIG. 1 and FIG. 7 with a 2:5 ratio. This flow rate reduction makes it possible to switch advantageously, for example, from non-lubricated piston compressors to non-lubricated "scroll" compressors, reducing the acoustic noise generated and the mechanical vibrations induced by the compressors to the relevant cars.

The system described in FIG. 6 may be equipped with a connection to an on-board communication system 623 arranged to connect at least two of the plurality of systems for the generation of compressed air, AGTU, and for air conditioning, HVAC, 711, . . . , 715 aboard said train 700. It should be considered that the main brake pipe 617 and the main tank 616 are the same for the whole train 700 and in common with all systems for the generation of compressed air and for air conditioning 711, . . . , 715.

In this case, the strategy for attributing the drive torque provided by the electric motors 601 to the first and second compressors 602, 608 of each system for the generation of compressed air and for air conditioning 711, . . . , 715 may be based on a distributed management.

The first among the systems for the generation of compressed air and for air conditioning 711, . . . , 715 which encounters the simultaneous request for mechanical torque to its first and second compressors 602, 608 from its electrical signals 619 and 621, 622, before prioritizing the request coming from the first electrical signal 619, as previously described in the first, second and third strategy, verifies, by exchanging information through the communication means 623, that at least one other system for the generation of compressed air and for air conditioning 711, . . . , 715 has requested mechanical torque to its second compressor 608 from at least one of either its second electrical signal 621 or third electrical signal 622. In this case, the first system for the generation of compressed air and for air conditioning will prioritize the request for mechanical torque to its first compressor 608 from at least one of its first electrical signal 621 or its second electrical signal 622.

In the presence of communication means 623 that allows the electronic control units 607 of the two or more systems for the generation of compressed air and for air conditioning 711, . . . , 715 to communicate with each other, other distributed strategies may be achieved, similar to the strategies described above, always globally prioritizing the request to supply the main tank 616 when the pressure value inside it has reached the minimum value.

Various aspects and embodiments of a system for the generation of compressed air and for air conditioning according to the invention have been described. It is understood that each embodiment may be combined with any other embodiment. Furthermore, the invention is not limited to the described embodiments, but may be varied within the scope defined by the appended claims.

The invention claimed is:

1. A system for a generation of compressed air and for air conditioning, for at least one railway vehicle, wherein said system comprises a first compressor arranged to generate compressed air to supply a main tank and a main brake pipe of a railway vehicle through an air drying unit and a second compressor arranged to compress a refrigerant gas for an air conditioning system of the at least one railway vehicle;

the system being characterized in that it comprises a single electric motor arranged to generate a mechanical torque adapted to be selectively provided to the first compressor, or to the second compressor, or simultaneously to both the first compressor and to the second compressor, as a function of:

a first electrical signal generated by a pressure measurement device and indicative of a pressure present in the main brake pipe; and at least one second electrical signal coming from the conditioning system and indicative of a pressure value or a humidity value, and at least one third electrical signal indicative of a temperature of an environment to be conditioned of the at least one railway vehicle.

2. The system according to claim 1, comprising an electronic control unit to control said system;

the electronic control unit being arranged to receive the first electrical signal, the at least one second electrical signal and at least one third electrical signal;

the electronic control unit being arranged to activate a power supply device, arranged to receive electric power distributed on board the railway vehicle, to supply said single electric motor when the first electrical signal indicates a need for mechanical torque for the first compressor, or if at least one of either the second electrical signal or the third electrical signal indicates a need for mechanical torque for the second compressor;

the electronic control unit being arranged to generate:

a first control signal for a first coupling means arranged to couple or decouple an electric motor and the first compressor;

a second control signal for a second coupling means arranged to couple or decouple an electric motor and the second compressor.

3. The system according to claim 2, wherein the electronic unit includes a non-volatile memory to preventively store control strategies of said system.

4. The system according to claim 3, wherein:

the first and second compressors each require their own peak mechanical torque, and the electric motor is able to provide a mechanical torque equal to, or greater than, the sum of the peak mechanical torques required by the first and second compressors;

when only the first electrical signal coming from the pressure measurement device indicates a need for mechanical torque for the first compressor, the electronic control unit operates on the first coupling means and on the second coupling means of said system to provide the mechanical torque generated by the electric motor only to the first compressor; and when only at least one of either the second electrical signal or the third electrical signal indicates the need for mechanical torque for the second compressor, the electronic unit operates on the first coupling means and on the second coupling means to provide the mechanical torque generated by the electric motor only to the second compressor;

when simultaneously the first electrical signal coming from the pressure measurement device indicates the need for mechanical torque for the first compressor and at least one of either the second electrical signal or the third electrical signal indicates a need for mechanical torque for the second compressor, the electronic unit operates on the first coupling means and on the second coupling means to simultaneously supply the mechanical torque generated by an electric motor to the first compressor and to the second compressor.

5. The system according to claim 3, wherein:

the first and second compressors each require their own peak mechanical torque, and the electric motor is able to provide a mechanical torque at least equal to the greater of the peak mechanical torques required by the first and second compressors;

when only the first electrical signal coming from the pressure measurement device indicates a need for mechanical torque for the first compressor, the electronic unit operates on the first coupling means and on the second coupling means to provide the mechanical torque generated by the electric motor only to the first compressor;

when only at least one of either the second electrical signal or the third electrical signal coming from the air conditioning system or from the environment to be conditioned indicates a need for mechanical torque for the second compressor, the electronic unit operates on the first coupling means and on the second coupling means to provide the mechanical torque generated by an electric motor only to the second compressor;

when simultaneously the first electrical signal coming from a pressure measurement device indicates a need for mechanical torque for the first compressor and at least one of either the first electrical signal or the second electrical signal coming from an air conditioning system or from the environment to be conditioned indicates a need for mechanical torque for the second compressor, the electronic unit operates on the first coupling means and on the second coupling means to provide the mechanical torque generated by an electric motor only to the first compressor.

6. The system according to claim 2, wherein:

the first and second compressors each require their own peak mechanical torque, and the electric motor is able to provide a mechanical torque at least equal to the greater among the peak mechanical torques required by the first and second compressors;

when only the first electrical signal coming from the pressure measurement device indicates a need for mechanical torque for the first compressor, the electronic unit operates on the first coupling means and on the second coupling means to provide the mechanical torque generated by the electric motor only to the first compressor;

when only at least one of either the second electrical signal or the third electrical signal coming from the air conditioning system or from the environment to be conditioned indicates a need for mechanical torque for the second compressor, the electronic unit operates on the first coupling means and on the second coupling means to provide the mechanical torque generated by the electric motor only to the second compressor;

when simultaneously the first electrical signal coming from a pressure measurement device indicates a pressure value of the main tank lower than a predetermined intermediate value and at least one of either the second electrical signal or the third electrical signal coming from an air conditioning system or from the environment to be conditioned indicates a need for mechanical torque for the second compressor, the electronic unit operates on the first coupling means and on the second coupling means to provide the mechanical torque generated by the electric motor only to the first compressor;

when simultaneously the first electrical signal coming from a pressure measurement device indicates a pressure value of the main tank higher than a predetermined intermediate value and at least one of either the second electrical signal or the third electric signal coming from an air conditioning system or from the environment to be conditioned indicates the need for mechanical torque for the second compressor, the electronic unit operates on the first coupling means and on the second coupling means to provide the mechanical torque generated by an electric motor only to the second compressor.

7. The system according to claim 6, wherein a predetermined intermediate pressure value is such as to ensure at least one emergency braking.

8. The system according to claim 2, wherein:

the first coupling means is an electromechanical joint arranged to mechanically couple or decouple a first half-shaft associated to the first compressor and a second half-shaft associated to the electric motor, upon command of said electronic unit, so as to connect the electric motor to the first compressor; and the second coupling means is an electromechanical joint arranged to mechanically couple or decouple a third half-shaft associated to an electric motor and a fourth half-shaft associated to the second compressor, upon command of said electronic unit, so as to connect an electric motor to the second compressor.

9. The system according to claim 2, wherein the electronic unit is connected to a further electronic unit of a further system for a generation of compressed air and for air conditioning, associated to a further railway vehicle of a train;

the electronic unit and the further electronic unit being connected by a communication means.

10. The system according to claim 9 wherein the communication means comprises a serial or wireless communication.

* * * * *